United States Patent
Youk et al.

(10) Patent No.: US 10,227,424 B2
(45) Date of Patent: Mar. 12, 2019

(54) VINYL CHLORIDE POLYMER AND PREPARATION METHOD THEREOF

(71) Applicant: LG CHEM, LTD., Seoul (KR)

(72) Inventors: Kyung Seog Youk, Daejeon (KR); Heung Kwon Bae, Daejeon (KR); Jung Rae Lee, Daejeon (KR); Kyung Hyun Kim, Daejeon (KR); Hyun Min Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 76 days.

(21) Appl. No.: 15/101,349

(22) PCT Filed: Sep. 14, 2015

(86) PCT No.: PCT/KR2015/009645
§ 371 (c)(1),
(2) Date: Jun. 2, 2016

(87) PCT Pub. No.: WO2016/047955
PCT Pub. Date: Mar. 31, 2016

(65) Prior Publication Data
US 2016/0311943 A1    Oct. 27, 2016

(30) Foreign Application Priority Data
Sep. 23, 2014 (KR) .................. 10-2014-0127050

(51) Int. Cl.
| | | |
|---|---|---|
| *C08F 14/06* | (2006.01) | |
| *C08F 2/02* | (2006.01) | |
| *C08F 2/44* | (2006.01) | |
| *C08F 2/00* | (2006.01) | |
| *C08F 4/38* | (2006.01) | |
| *C08F 6/00* | (2006.01) | |

(52) U.S. Cl.
CPC .............. *C08F 14/06* (2013.01); *C08F 2/001* (2013.01); *C08F 2/02* (2013.01); *C08F 2/44* (2013.01); *C08F 4/38* (2013.01); *C08F 6/006* (2013.01)

(58) Field of Classification Search
CPC ...... C08F 14/06; C08F 114/06; C08F 214/06; C08F 2/001; C08F 2/44; C08F 2/02; C08F 8/30; C08F 8/40; C08J 2327/06
See application file for complete search history.

(56) References Cited

U.S. PATENT DOCUMENTS

| | | | |
|---|---|---|---|
| 2,364,227 A | 12/1944 | Lewis | |
| 4,460,754 A * | 7/1984 | Redinger | ................ C08F 14/06 524/714 |
| 4,526,946 A | 7/1985 | Fitzpatrick et al. | |
| 5,428,087 A * | 6/1995 | Petit | ...................... C08G 18/08 524/127 |
| 5,552,481 A * | 9/1996 | Galvez | .................... C08L 23/02 525/317 |
| 9,334,344 B2 | 5/2016 | Hiermeier et al. | |
| 2001/0004658 A1 | 6/2001 | Stieneker et al. | |
| 2009/0093577 A1 | 4/2009 | Berard et al. | |
| 2012/0095176 A1 | 4/2012 | Hiermeier et al. | |

FOREIGN PATENT DOCUMENTS

| | | |
|---|---|---|
| CN | 1156156 A | 8/1997 |
| CN | 103119073 A | 5/2013 |
| EP | 0191875 A1 | 2/1985 |
| JP | 06-192523 A | 7/1994 |
| KR | 1020040021609 A | 3/2004 |
| KR | 1020080112305 A | 12/2008 |
| KR | 10-2011-0006223 A | 1/2011 |
| KR | 2011-0006223 * | 1/2011 |
| KR | 1020110006224 A | 1/2011 |
| KR | 1020120007227 A | 1/2012 |
| KR | 10-1198530 B1 | 11/2012 |
| KR | 10-2012-0130801 A | 12/2012 |

OTHER PUBLICATIONS https://web.archive.org/web/20140909031421/https://en.wikipedia.org/wiki/Bulk_polymerization; 2013.*
KR 2011-0006223, machine translation, 2011.*

* cited by examiner

*Primary Examiner* — Roberto Rabago
(74) *Attorney, Agent, or Firm* — Dentons US LLP

(57) ABSTRACT

The present invention relates to a method of preparing a vinyl chloride polymer having good thermal stability due to the restraint of dehydrochlorination by heat or ultraviolet rays, and a vinyl chloride polymer prepared thereby. In the preparation method through bulk polymerization, a modifier is introduced to a polymerization process to impart the vinyl chloride polymer with high thermal stability without inducing modification. Therefore, the preparation method via the bulk polymerization of the vinyl chloride polymer and the vinyl chloride polymer prepared thereby according to the present invention may be readily applied to industries requiring thereof such as industries concerning a vinyl chloride resin and the molded article thereof.

8 Claims, No Drawings

VINYL CHLORIDE POLYMER AND PREPARATION METHOD THEREOF

This application is a National Stage Application of International Application No. PCT/KR2015/009645, filed Sep. 14, 2015, and claims the benefit of Korean Patent Application No. 10-2014-0127050, filed Sep. 23, 2014, and the contents of which are incorporated herein by reference in their entirety for all purposes as if fully set forth below.

TECHNICAL FIELD

Cross-Reference to Related Applications

This application claims the benefits of priority from Korean Patent Application No. 10-2014-0127050, filed on Sep. 23, 2014, the entire contents described in the disclosure of corresponding Korean patent applications are hereby incorporated as a part of the present specification.

TECHNICAL FIELD

The present invention relates to a method of preparing a vinyl chloride polymer having good thermal stability due to the restraint of dehydrochlorination by heat or ultraviolet rays, and a vinyl chloride polymer prepared thereby.

BACKGROUND ART

A vinyl chloride polymer is a polymer including 50% or more of vinyl chloride, is cheap, allows easy control of hardness, is applicable in most processing equipments and has diverse application fields. In addition, the vinyl chloride polymer may provide a molded product having good physical and chemical properties such as mechanical strength, climate resistance and chemical resistance, and is widely used in diverse fields.

However, the vinyl chloride polymer may induce dehydrochlorination due to the defects of chemical structures, generated during a polymerization reaction by heat or ultraviolet rays applied during processing and may induce the discoloration of a resin or the deterioration of physical properties.

Particularly, in a vinyl chloride polymer, chemical defects generated during a polymerization reaction, i.e., the defects of the chemical structures of allyl chloride and tertiary chloride are present. Due to the defects of the chemical structure, the binding energy of carbon with chlorine in the vinyl chloride polymer may be much lower than that of carbon with chlorine in a normal molecular structure, and the bonding between carbon and chlorine may be easily broken due to external radical transfer during processing the vinyl chloride polymer. Separated hydrogen chloride from a polymer chain accelerates other side reactions through an auto-catalyst reaction to produce another hydrogen chloride continuously. In addition, a double bond may be formed at the site from where the hydrogen chloride has been removed, and a number of double bonds may be overlapped to generate the discoloration of a resin and the deterioration of physical properties. That is, in a vinyl chloride polymer or a molded product processed therefrom, a dehydrochlorination reaction may be generated due to heat or ultraviolet rays, thereby generating the discoloration defects of a vinyl chloride polymer or the deterioration or change of physical properties.

In order to improve the limitations of the vinyl chloride polymer, an organometallic compound containing a metal such as Ba, Zn, Ca and Pb has been mixed with the vinyl chloride polymer to restrain the generation of radicals or ions during thermal decomposition of the vinyl chloride polymer and to control the thermal decomposition rate of a resin. Recently, a method of using a thermal stabilizer of diverse types such as a metallic material or an organic compound has been introduced. However, the use thereof is limited due to environmental problems caused by the use of a heavy metal stabilizer and high price.

A method of blending a polymer having good heat resistance with a vinyl chloride polymer has been suggested to complement weak physical properties however is not easily used due to low miscibility with the vinyl chloride polymer and difficulty in processing.

With such a background, the inventors of the present disclosure studied on a method of improving the thermal stability of a vinyl chloride polymer by effectively restraining a dehydrochlorination reaction (a dehydrochloric acid reaction), prepared a vinyl chloride polymer by adding at least one modifier of oxycarboxylates, inorganic phosphates or ethylenediamine tetraacetates to a vinyl chloride monomer and bulk polymerizing, measured the generation degree of scale, the amount of dehydrochloric acid and thermal stability (Blackening index), found that the generation degree of the scale is extremely small, the amount of dehydrochloric acid is decreased, and the thermal stability (Blackening index) is improved, and achieved the present invention.

DISCLOSURE OF THE INVENTION

Technical Problem

The present invention provides a method of preparing a vinyl chloride polymer through bulk polymerization, having improved thermal stability by restraining the dehydrochlorination reaction of a vinyl chloride polymer due to heat or ultraviolet rays.

The present invention also provides a vinyl chloride polymer prepared by the preparation method through bulk polymerization.

Technical Solution

According to an aspect of the present invention, there is provided a method of preparing a vinyl chloride polymer through bulk polymerization, characterized in including pre-polymerizing to form nuclear particles (step 1); and adding a vinyl chloride monomer and a post-polymerization initiator to the nuclear particles and conducting post-polymerization (step 2), and 0.001 to 10 parts by weight of a modifier relative to 100 parts by weight of the vinyl chloride monomer is added during the post-polymerization.

According to another aspect of the present invention, there is provided a vinyl chloride polymer prepared by the preparation method through bulk polymerization.

Effects of the Invention

In the method of preparing a vinyl chloride polymer through bulk polymerization according to the present invention, a modifier is introduced, and the vinyl chloride polymer may be imparted with high thermal stability without generating modification.

Accordingly, the method of preparing a vinyl chloride polymer through bulk polymerization and the vinyl chloride polymer prepared thereby may be readily applied to an industry requiring the vinyl chloride polymer, for example, industries concerning a vinyl chloride resin and the molded product thereof.

BEST MODE FOR CARRYING OUT THE INVENTION

Hereinafter, the present invention will be explained in more detail to assist the understanding of the present invention.

It will be further understood that terms or words used in the description and claims should not be interpreted as having a meaning such as those defined in commonly used dictionaries, however should be interpreted as having a meaning and concept that is consistent with the technical spirit of the present invention on the basis of a principle that an inventor may define the concept of terms appropriately to explain his invention by the best way.

The present invention provides a method of preparing a vinyl chloride polymer having improved thermal stability due to the restraint of a dehydrochlorination reaction through bulk polymerization, and a vinyl chloride polymer prepared thereby.

The method of preparing a vinyl chloride polymer through bulk polymerization according to an embodiment of the present invention is characterized in including pre-polymerizing to form nuclear particles (step 1); and adding a vinyl chloride monomer and a post-polymerization initiator to the nuclear particles and conducting post-polymerization (step 2), wherein 0.001 to 10 parts by weight of a modifier relative to 100 parts by weight of the vinyl chloride monomer is added during the post-polymerization.

Step 1 is a pre-polymerizing step for forming the nuclear particles of the vinyl chloride polymer and may be conducted by adding a vinyl chloride monomer and a pre-polymerization initiator to a reactor, and pre-polymerizing.

Particularly, the pre-polymerizing may be conducted by a common method known in the art, without specific limitation. For example, the pre-polymerizing may be conducted by adding a vinyl chloride polymer and a pre-polymerization initiator to a pre-polymerization reactor and, controlling the reaction pressure and temperature.

The pre-polymerization initiator may be used in an amount ratio from 0.05 to 1 parts by weight relative to 100 parts by weight of the vinyl chloride monomer, and the kind of the pre-polymerization initiator is not specifically limited, however commonly known materials in the art may be used. For example, peroxy esters, peroxydicarbonates, etc. may be used. Particularly, di-2-ethylhexyl peroxydicarbonate, t-butyl peroxy neodecanoate, or a mixture thereof may be used.

The vinyl chloride monomer may be only vinyl chloride monomer or a mixture of the vinyl chloride monomer with a vinyl monomer copolymerizable with the vinyl chloride monomer. The vinyl monomer copolymerizable with the vinyl chloride monomer is not specifically limited, however may include an olefin compound such as ethylene, propylene, and butane; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; vinylidene halide such as vinylidene chloride; unsaturated fatty acid and anhydrides of the fatty acid such as acrylic acid, methacrylic acid, itaconic acid, maleic acid, fumaric acid, maleic anhydride, and itaconic anhydride; unsaturated fatty acid esters such as methyl acrylate, ethyl acrylate, monomethyl maleate, dimethyl maleate, and butylbenzyl maleate; a crosslinking monomer such as diallyl phthalate. The vinyl monomers may be used alone or as a mixture of two or more.

The reaction pressure and the temperature are not specifically limited and may be commonly known conditions. For example, the reaction pressure may be from 7.5 K/G to 13 K/G, and the temperature may be within a range from 30° C. to 70° C.

Step 2 is a step for preparing a vinyl chloride polymer by growing the nuclear particles prepared in the pre-polymerizing step and may be conducted by adding a vinyl chloride monomer and a post-polymerization initiator to the nuclear particles prepared in the pre-polymerizing step, and post-polymerizing. In this case, the post-polymerization may be conducted while adding a modifier to impart the vinyl chloride polymer with high thermal stability as described above.

Particularly, the post-polymerization is not specifically limited, however may be conducted by a commonly known method in the art. For example, the post-polymerization may be conducted by transferring the nuclear particles prepared in the pre-polymerizing step to a reactor for post-polymerization filled with an additional vinyl chloride monomer (vinyl chloride monomer added during post-polymerization), adding a post-polymerization initiator thereto, and controlling the reaction pressure and the temperature of the reactor.

The post-polymerization initiator is not specifically limited, and may be used in an amount ratio from 0.1 to 2 parts by weight relative to 100 parts by weight of the additional vinyl chloride monomer (vinyl chloride monomer added during post-polymerization). The post-polymerization initiator may be added to the reactor for post-polymerization while transferring the nuclear particles or may be added after completing the transfer of the nuclear particles or during post-polymerization. Particularly, the post-polymerization initiator may be added immediately after completing the transfer of the nuclear particles or at a point when a post-polymerization conversion ratio is from 10% to 40% after completing the transfer. In this case, the post-polymerization initiator may be added in batches, or separately added, or continuously added.

The kind of the post-polymerization initiator used for post-polymerization is not specifically limited, however commonly known materials may be used, for example, peroxy esters or peroxydicarbonates. Particularly, cumyl peroxy ester, t-butyl peroxy ester, octyl peroxydicarbonate, 1,1,3,3-tetramethyl butyl peroxy neodicarbonate, etc. may be used.

The additional vinyl chloride monomer (vinyl chloride monomer added during post-polymerization) is the same as described above.

The post-polymerizing step may be conducted by adding a modifier to impart the vinyl chloride polymer thus prepared with high thermal stability, and the modifier may be added to the reactor for post-polymerization together with the additional vinyl chloride monomer, or at any time during post-polymerization so as to be participated in the polymerization. Through the addition of the modifier, the generation of a dehydrochlorination reaction on the exposure of the vinyl chloride polymer thus prepared to heat or ultraviolet rays may be restrained, and thermal stability of the vinyl chloride polymer may be markedly improved. Also, the discoloration of the vinyl chloride polymer due to heat and ultraviolet rays may be prevented.

Particularly, the modifier may be added to the reactor for post-polymerization together with the additional vinyl chloride monomer prior to initiating the post-polymerization or at a point when a polymerization conversion ratio is 30% or more, preferably, from 50% to 95%, and more preferably, from 80% to 95% after initiating the post-polymerization.

The modifier according to an embodiment of the present invention may be included in an amount ratio from 0.001 to 10 parts by weight relative to 100 parts by weight of the vinyl chloride monomer, and the amount may be changed according to the kind of the modifier.

Particularly, the modifier may be at least one selected from the group consisting of oxycarboxylates, inorganic phosphates, and ethylenediamine tetraacetates.

The oxycarboxylates are not specifically limited, however may be citric acid or trisodium citrate. In the case where the modifier is the oxycarboxylate, the oxycarboxylate may be included in an appropriate amount ratio within a range from 0.001 to 10 parts by weight and may preferably be included in an amount ratio from 0.001 to 1 parts by weight relative to 100 parts by weight of the vinyl chloride monomer as described above. If the amount of the oxycarboxylate is less than 0.001 parts by weight, the restraining effect of the dehydrochlorination reaction may be trivial, and the improving effect of the thermal stability of the vinyl chloride polymer may be deteriorated, and if the amount of the oxycarboxylate is greater than 10 parts by weight, the processability of the vinyl chloride polymer including thereof may be deteriorated, and the coloring property of a molded article therefrom may be deteriorated.

The inorganic phosphate is not specifically limited, however may be disodium diphosphate or tetrasodium diphosphate, and may particularly be the tetrasodium diphosphate. In the case where the modifier is the inorganic phosphate, the inorganic phosphate may be included in an appropriate amount ratio within a range from 0.001 to 10 parts by weight and may preferably be included in an amount ratio from 0.001 to 1 parts by weight relative to 100 parts by weight of the vinyl chloride monomer as described above. If the amount of the inorganic phosphate is less than 0.001 parts by weight, the restraining effect of a dehydrochlorination reaction may be trivial, and the improving effect of the thermal stability of the vinyl chloride polymer may be deteriorated, and if the amount of the inorganic phosphate is greater than 10 parts by weight, the processability of the vinyl chloride polymer including thereof may be deteriorated, and the coloring property of a molded article therefrom may be deteriorated.

The ethylenediamine tetraacetate is not specifically limited, however may be disodium ethylenediamine tetraacetic acid or tetrasodium ethylenediamine tetraacetic acid, and may particularly be the tetrasodium ethylenediamine tetraacetic acid. In the case where the modifier is the ethylenediamine tetraacetate, the ethylenediamine tetraacetate may be included in an appropriate amount ratio within a range from 0.001 to 10 parts by weight and may preferably be included in an amount ratio from 0.001 to 1 parts by weight relative to 100 parts by weight of the vinyl chloride monomer as described above. If the amount of the ethylenediamine tetraacetate is less than 0.001 parts by weight, the restraining effect of a dehydrochlorination reaction may be trivial, and the improving effect of the thermal stability of the vinyl chloride polymer may be deteriorated, and if the amount of the ethylenediamine tetraacetate is greater than 10 parts by weight, the processability of the vinyl chloride polymer including thereof may be deteriorated, and the coloring property of a molded article therefrom may be deteriorated.

The reaction pressure and the reaction temperature at the post-polymerizing step are not specifically limited and may be commonly known conditions in the art. For example, the reaction pressure may be from 7.5 K/G to 13 K/G, and the reaction temperature may be within a range from 30° C. to 70° C.

In the preparation method through bulk polymerization according to the present invention, a polymerization inhibitor may be added at the end of post-polymerization to eliminate the reactivity of a remaining post-polymerization initiator.

The polymerization inhibitor is not specifically limited, however commonly known materials in the art may be used. For example, hydroquinone, butylated hydroxytoluene, monomethyl ether hydroquinone, quaternary butyl catechol, diphenylamine, triisopropanolamine, triethanolamine, etc. may be used. The amount used of the polymerization inhibitor may be controlled according to the amount of the post-polymerization initiator and may be in an amount ratio from 0.001 to 0.1 parts by weight relative to 100 parts by weight of the vinyl chloride monomer.

In the preparation method through bulk polymerization according to the present invention, a reaction medium may be used together with the vinyl chloride monomer, and an additive such as a molecular weight controller may be used other than the above-described effective components.

The reaction medium is not specifically limited and may be a common organic solvent. For example, the reaction medium may include an aromatic compound such as benzene, toluene, and xylene, methyl ethyl ketone, acetone, n-hexane, chloroform, cyclohexane, etc.

The molecular weight controller is not specifically limited, however may be, for example, n-butyl mercaptan, n-octyl mercaptan, n-dodecyl mercaptan, t-dodecyl mercaptan, etc.

Also, there is provided a vinyl chloride polymer prepared by the preparation method through bulk polymerization in the present invention.

The vinyl chloride polymer according to an embodiment of the present invention has an average particle diameter from 120 μm to 180 μm.

Hereinafter, the present invention will be explained in more detail referring to the following examples and experimental examples. However, the examples and the experimental examples are for illustrating the present invention, and the scope of the present invention is not limited thereto.

Example 1

135 kg of a vinyl chloride monomer was injected to a 200 L reactor for pre-polymerization equipped with a turbine-type impeller, and 0.05 parts by weight of di-2-ethyl hexyl peroxydicarbonate (OPP) relative to 100 parts by weight of the vinyl chloride monomer was injected thereto, followed by elevating the pressure to 10 K/G and polymerizing for 16 minutes to prepare nuclear particles with the size of 110 μm. The nuclear particles thus prepared were transferred to a 500 L reactor for post-polymerization including 60 parts by weight of the vinyl chloride monomer and equipped with a screw/scraper-type impeller, and 0.1 parts by weight of 1,1,3,3-tetramethyl butyl peroxy neodicarbonate (OND) was additionally injected after finishing the transfer, followed by post-polymerizing under the pressure of 7.1 K/G for 40 minutes, and elevating the pressure to 8.0 K/G for 140 minutes and polymerizing. Prior to initiating the post-polymerization, 0.1 parts by weight of tetrasodium diphosphate (TSDP) was injected to the reactor for post-polymerization, and post-polymerization was initiated. At the end of the polymerization, 0.01 parts by weight of butylated hydroxytoluene was injected, followed by stirring and heating at 66° C. under vacuum for 20 minutes to remove remaining vinyl chloride monomer and obtain a vinyl chloride polymer.

Example 2

A vinyl chloride polymer was obtained by conducting the same procedure described in Example 1 except for injecting tetrasodium diphosphate (TSDP) not before initiating the post-polymerization but at a point when a polymerization conversion ratio was 30% after initiating the post-polymerization.

Example 3

A vinyl chloride polymer was obtained by conducting the same procedure described in Example 1 except for injecting 0.1 parts by weight of tetrasodium ethylenediamine tetraacetate (EDTA-4Na) instead of tetrasodium diphosphate (TSDP).

Example 4

A vinyl chloride polymer was obtained by conducting the same procedure described in Example 1 except for injecting 0.1 parts by weight of trisodium citrate instead of tetrasodium diphosphate (TSDP).

Example 5

A vinyl chloride polymer was obtained by conducting the same procedure described in Example 1 except for injecting tetrasodium diphosphate (TSDP) not before initiating the post-polymerization but at a point when a polymerization conversion ratio was 80%.

Example 6

A vinyl chloride polymer was obtained by conducting the same procedure described in Example 5 except for injecting 0.1 parts by weight of tetrasodium ethylenediamine tetraacetate (EDTA-4Na) instead of tetrasodium diphosphate (TSDP).

Example 7

A vinyl chloride polymer was obtained by conducting the same procedure described in Example 5 except for injecting 0.1 parts by weight of trisodium citrate instead of tetrasodium diphosphate (TSDP).

Comparative Example 1

A vinyl chloride polymer was obtained by conducting the same procedure described in Example 1 except for not injecting tetrasodium diphosphate (TSDP).

Experimental Example

Physical properties of the vinyl chloride polymers prepared in Examples 1 to 7 and Comparative Example 1 were measured, compared and analyzed, and the results are shown in the following Table 1.

1) Thermal Stability

The thermal stability of each vinyl chloride polymer prepared in Examples 1 to 7 and Comparative Example 1 were compared and analyzed. Heat was applied to each vinyl chloride polymer of Examples 1 to 7 and Comparative Example 1, and time required for changing the color thereof to black was analyzed.

Particularly, each vinyl chloride polymer was inserted into an oven at 195° C., and time required for changing the color thereof to black was measured.

2) Dehydrochlorination Amount 10 g of each vinyl chloride polymer of Examples 1 to 7 and Comparative Example 1 was injected to a small reactor and was heated to 180° C. The hydrochloric acid thus produced was collected in 200 mL of distilled water and the pH thereof was measured to calculate the amount of hydrochloric acid produced.

3) Generated Amount of Scale

Each vinyl chloride polymer of Examples 1 to 7 and Comparative Example 1 was filtered using a 45 mesh, and the amount of impurities did not go through was measured.

TABLE 1

| Division | Thermal stability (min) | Dehydrochlorination amount (mol/L, ×10$^{-6}$) |
|---|---|---|
| Example 1 | 17 | 2.2 |
| Example 2 | 16 | 2.3 |
| Example 3 | 16 | 2.4 |
| Example 4 | 17 | 2.5 |
| Example 5 | 19 | 2.2 |
| Example 6 | 19 | 2.4 |
| Example 7 | 18 | 2.2 |
| Comparative Example 1 | 13 | 3.3 |

As shown in Table 1, the vinyl chloride polymers of Examples 1 to 7 prepared using a modifier by bulk polymerization according to the present invention have a decreased amount of dehydrochlorination and improved thermal stability (markedly low blackening index) when compared to the vinyl chloride polymer prepared in Comparative Example 1.

Particularly, the vinyl chloride polymer of Comparative Example 1 prepared by not adding any modifier suggested in the present invention had an increased amount of dehydrochlorination and deteriorated thermal stability when compared to those of the vinyl chloride polymer of Example 1 to 7.

In addition, among the vinyl chloride polymers of Examples 1 to 7 prepared by adding the modifier according to the present invention, the vinyl chloride polymers prepared in Examples 5 to 7 by injecting the modifier at a point when a polymerization conversion ratio was 80% or more have a decreased amount of dehydrochlorination and better thermal stability when compared to the vinyl chloride polymers prepared in Examples 1 to 4 prepared by adding the modifier before initiating polymerization (at a point when a polymerization conversion ratio was 0%). The results mean that the physical properties of the vinyl chloride polymers may be improved by adding the modifier, and vinyl chloride polymers having more preferable physical properties may be obtained by controlling the injection time of the modifier.

The invention claimed is:

1. A method of preparing a vinyl chloride polymer through bulk polymerization, the method comprising:
   pre-polymerizing to form nuclear particles; and
   adding a vinyl chloride monomer and a post-polymerization initiator to the nuclear particles, and conducting post-polymerization,
   wherein 0.001 to 10 parts by weight of a modifier relative to 100 parts by weight of the vinyl chloride monomer is added during the post-polymerization, and
   wherein the modifier is at least one selected from the group consisting of trisodium citrate, inorganic phosphate, and ethylenediamine tetraacetate.

2. The method of preparing a vinyl chloride polymer of claim 1, wherein the modifier is added during the post-polymerization at a point when a polymerization conversion ratio is 50% or more.

3. The method of preparing a vinyl chloride polymer of claim 1, wherein the modifier added during the post-polymerization at a point when a polymerization conversion ratio is from 80% to 95%.

4. The method of preparing a vinyl chloride polymer of claim 1, wherein the inorganic phosphate is disodium diphosphate or tetrasodium diphosphate.

5. The method of preparing a vinyl chloride polymer of claim 1, wherein the ethylenediamine tetraacetate is disodium ethylenediamine tetraacetate or tetrasodium ethylenediamine tetraacetate.

6. The method of preparing a vinyl chloride polymer of claim 1,
   wherein the modifier is trisodium citrate, and the trisodium citrate is included in an amount ratio from 0.001 to 1 parts by weight.

7. The method of preparing a vinyl chloride polymer of claim 1,
   wherein the modifier is inorganic phosphate, and
   the inorganic phosphate is included in an amount ratio from 0.001 to 1 parts by weight.

8. The method of preparing a vinyl chloride polymer of claim 1,
   wherein the modifier is ethylenediamine tetraacetate, and
   the ethylenediamine tetraacetate is included in an amount ratio from 0.001 to 1 parts by weight.

* * * * *